(12) United States Patent
Lee et al.

(10) Patent No.: US 7,983,285 B2
(45) Date of Patent: Jul. 19, 2011

(54) HOMENETWORK UNIVERSAL MIDDLEWARE BRIDGE SYSTEM AND METHOD FOR HOME DEVICE'S INTEROPERABILITY IN HETEROGENEOUS HOMENETWORK MIDDLEWARE

(75) Inventors: Chang-eun Lee, Daejeon (KR); Jun-hee Park, Daejeon (KR); Young-sung Son, Daejeon (KR); Dong-hee Kim, Daejeon (KR); Kyeong-deok Moon, Daejeon (KR); Yu-seok Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 698 days.

(21) Appl. No.: 11/721,951

(22) PCT Filed: Dec. 16, 2005

(86) PCT No.: PCT/KR2005/004345
§ 371 (c)(1),
(2), (4) Date: Jun. 15, 2007

(87) PCT Pub. No.: WO2006/065098
PCT Pub. Date: Jun. 22, 2006

(65) Prior Publication Data
US 2008/0112419 A1 May 15, 2008

(30) Foreign Application Priority Data
Dec. 17, 2004 (KR) .................. 10-2004-0108285

(51) Int. Cl.
*H04L 12/56* (2006.01)
*H04J 3/22* (2006.01)
(52) U.S. Cl. .................. 370/402; 370/401; 370/466

(58) Field of Classification Search .................. 370/401, 370/402, 466; 709/220
See application file for complete search history.

(56) References Cited

U.S. PATENT DOCUMENTS

| | | | |
|---|---|---|---|
| 6,157,982 A * | 12/2000 | Deo et al. ................. | 711/100 |
| 6,683,883 B1 * | 1/2004 | Czeiger et al. ............ | 370/401 |
| 7,761,571 B2 * | 7/2010 | Bushmitch et al. ........ | 709/226 |
| 2001/0001268 A1 * | 5/2001 | Menon et al. .............. | 370/329 |
| 2002/0163534 A1 * | 11/2002 | Choi et al. ................. | 345/734 |
| 2003/0016682 A1 * | 1/2003 | Cho ........................... | 370/401 |
| 2003/0018753 A1 * | 1/2003 | Seki .......................... | 709/219 |
| 2003/0046437 A1 * | 3/2003 | Eytchison et al. ......... | 709/250 |
| 2004/0139177 A1 * | 7/2004 | Yook ......................... | 709/220 |
| 2006/0190571 A1 * | 8/2006 | Kim et al. .................. | 709/220 |

FOREIGN PATENT DOCUMENTS

| | | |
|---|---|---|
| JP | 04-107032 | 4/1992 |
| JP | 2001-155022 | 6/2001 |
| JP | 2003-134142 | 5/2003 |
| JP | 2004-318852 | 11/2004 |

(Continued)

*Primary Examiner* — Dang T Ton
*Assistant Examiner* — Robert M Morlan

(57) ABSTRACT

Provided is a home-network UMB system and a method thereof for providing interoperability between devices connected one another through different types of middlewares in a home network. The home-network UMB system includes: a bridge core for establishing/releasing a connection between bridge adaptors of different types of middlewares and analyzing/transferring a universal middleware message in order to interoperate devices connected through different types of middlewares existed on a home network; and a plurality of bridge adaptor for connecting the bridge core to a corresponding middleware, and finding/releasing different types of devices, controlling/monitoring different types of devices and registering/creating an event for different types of devices through transforming a universal middleware bridge message to a local message of each middleware and vice versa.

10 Claims, 12 Drawing Sheets

FOREIGN PATENT DOCUMENTS

| | | |
|---|---|---|
| KR | 10-2003-0004540 A | 1/2003 |
| KR | 10-2003-0062732 A | 7/2003 |
| KR | 10-2003-0070300 A | 8/2003 |
| KR | 10-2003-0075691 A | 9/2003 |
| KR | 10-2004-0054040 A | 6/2004 |
| WO | WO2004049671 A1 | 6/2004 |

* cited by examiner

[Fig. 1]
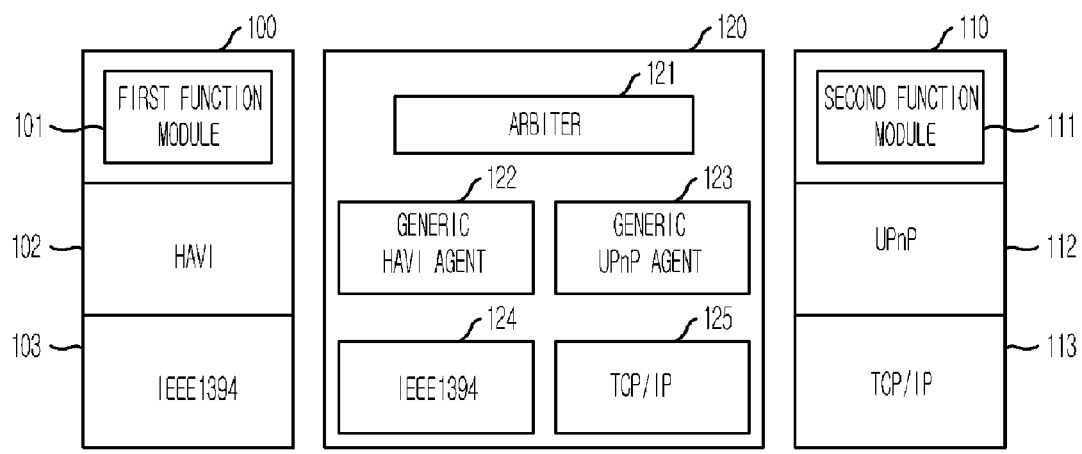

[Fig. 2]
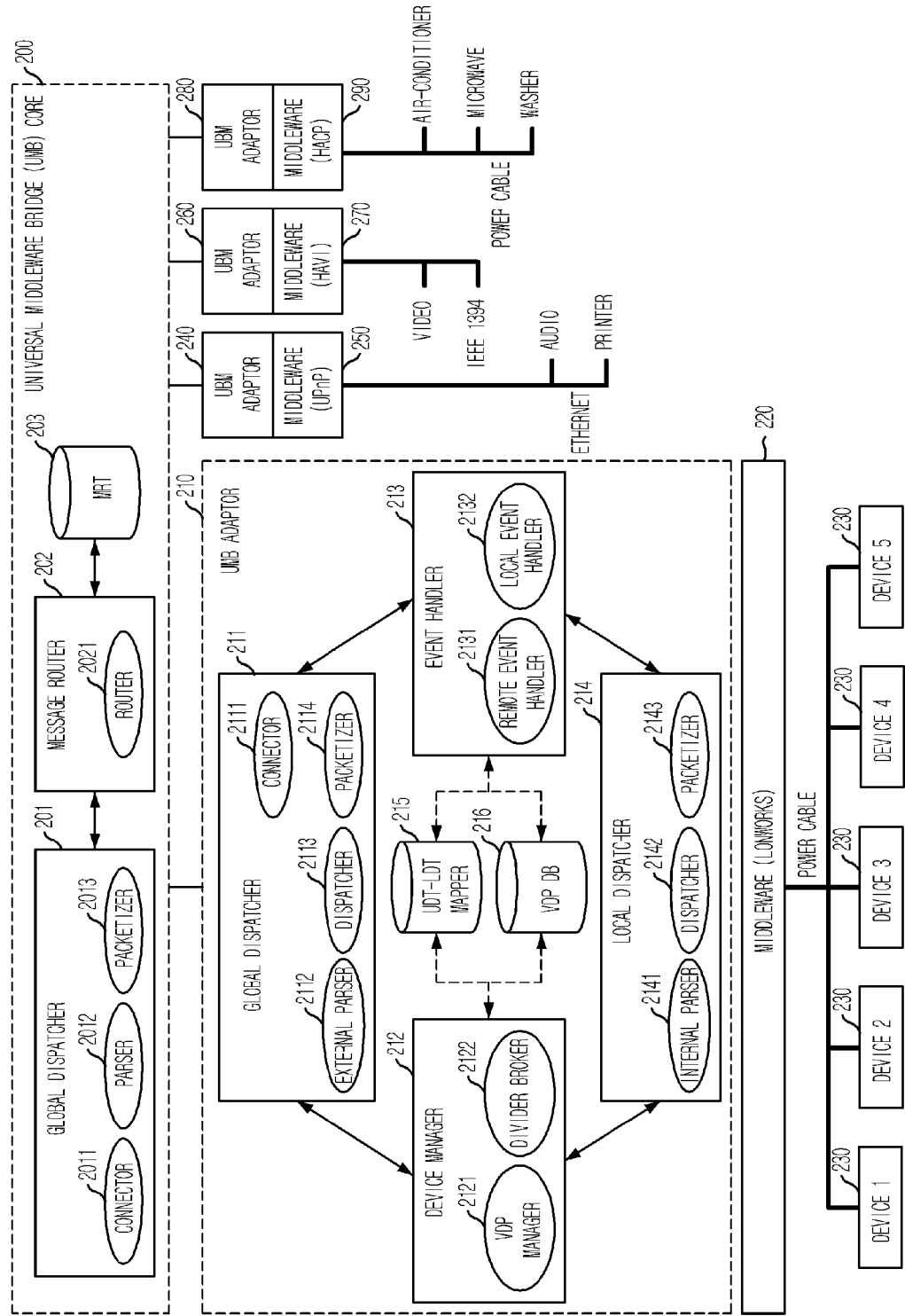

[Fig. 3]

| | MESSAGE TYPE | MAJOR FACTOR (Target/Req/Resp) | DESCRIPTION |
|---|---|---|---|
| MIDDLEWARE | SSDP FIND MESSAGE (USING SSDP) | IP Port | UMB ADAPTOR FINDS UMB CORE SOCKET MODULE. UMB CORE TRANSMITS NOTICE MESSAGES TO UMB ADAPTORS |
| | QueryDeviceList | | CONNECTED TO OTHER MIDDLE NETWORKS AND REQUEST LIST OF ALL DEVICES |
| | NotifyOnlineStatus | Middleware ID Device ID Online status | NOTICE CONNECTION STATES OF UMB ADAPTOR OR DEVICE EVENT GENERATED WHEN UMB ADAPTOR OR DEVICE ARE CONNECTED TO NETWORK OR DISCONNECTED FROM NETWORK |
| EVENT | NotifyDeviceState | Device ID Function ID Event ID parameters | TRANSMIT WHEN STATE OF DEVICE IS CHANGED |
| | SubscribeDeviceEvent | Device ID Function ID Event ID | REGISTER EVENT IF IT WANTS TO RECEIVE EVENT OF SELECTED DEVICE |
| CONTROL/ MONITOR | QueryDeviceState | Device ID Function ID Action ID parameters | INQUIRE CURRENT STATE OF SERVICE FROM SELECTED DEVICE |
| | QueryAction | Device ID Function ID Action ID parameters | CONTROL SELECTED MODULE AND DEVICE |

[Fig. 4]

| INDEX | FILE DESCRIPTOR | MIDDLEWARE ID |
|---|---|---|
| 0 | Fd0 | CORE |
| 1 | Fd1 | LONWORKS |
| 2 | Fd2 | UPnP |
| 3 | Fd3 | HnCP |

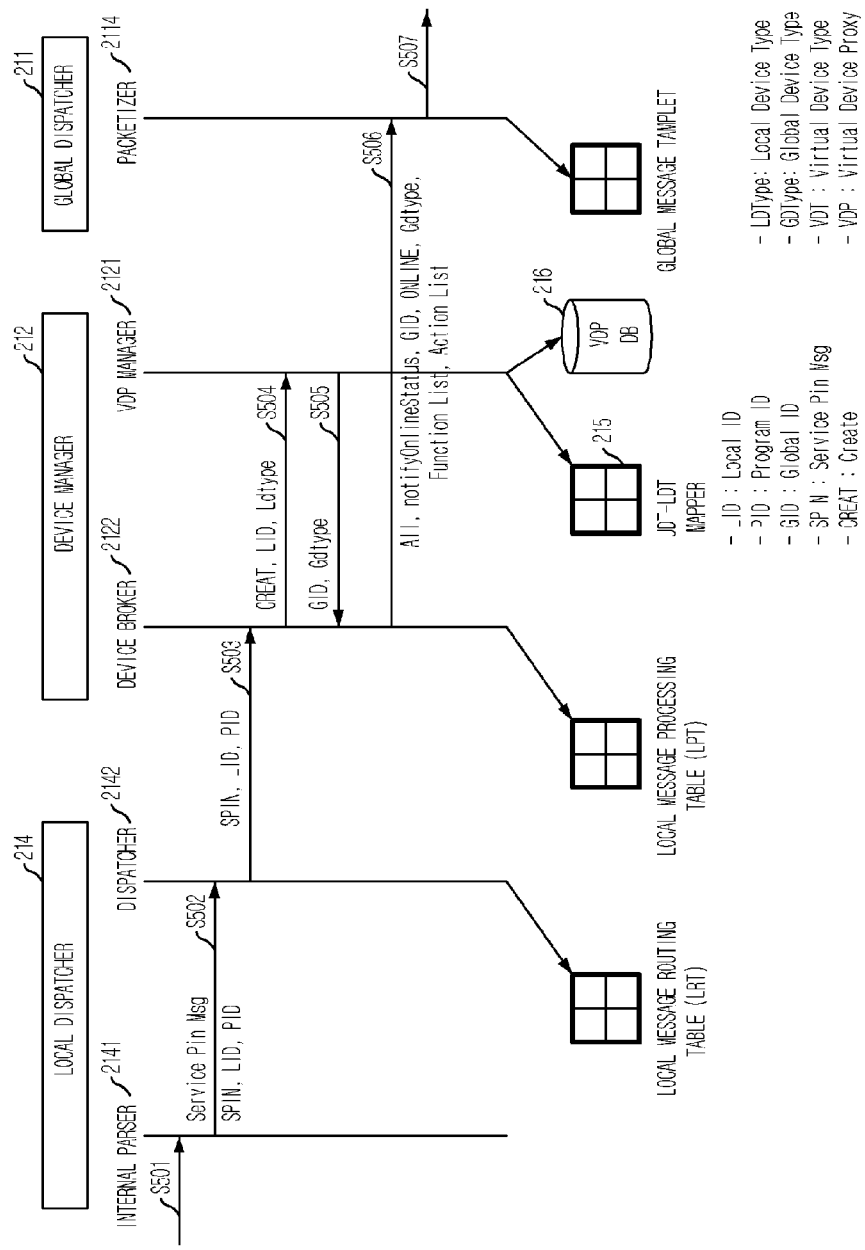
[Fig. 5]
[Fig. 6]

[Fig. 7]

| CHARACTER | FIELD SEMANTIC | EXAMPLE |
|---|---|---|
| Index | VDP index | 0 |
| Virtual/Physical | VDP or Local Physical Device | Local |
| GID | Global ID | LonWorks, NID |
| LID | Local (Middleware) ID | 0x1122334455566 |
| GDType | Device Type of VDT | LIGHT |
| LDType | Device Type of Local | 0x05 0x01 |
| Local address | LonWare DB index | 1 |
| Function List | Available Function List | F1 |
| Action List | Available Action List | F2, ... |

Action List

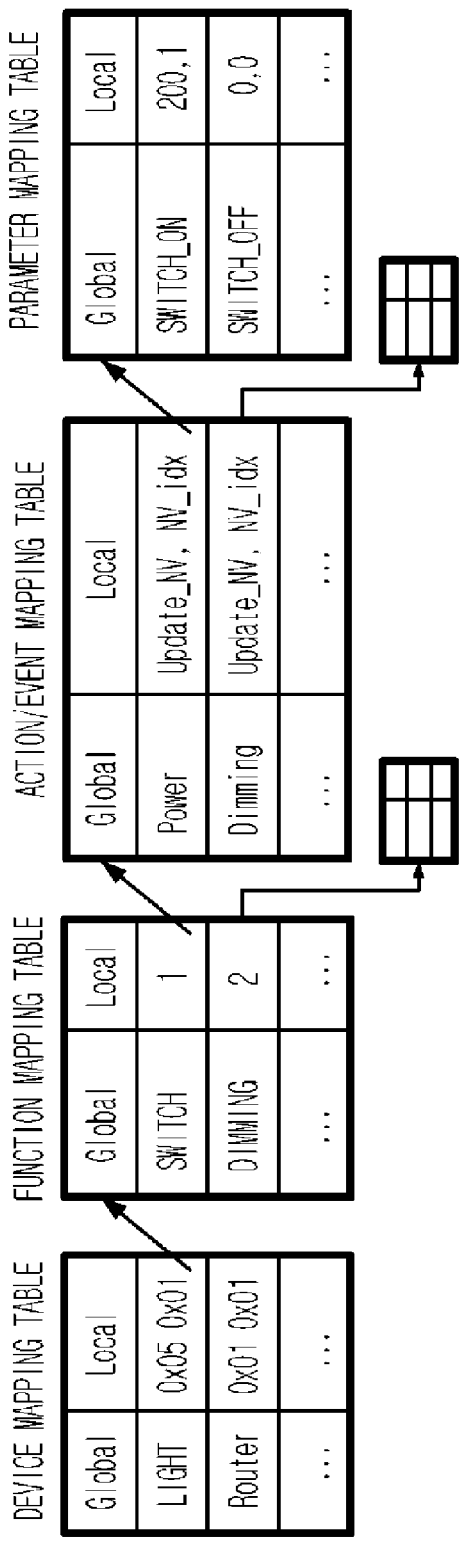
[Fig. 8]

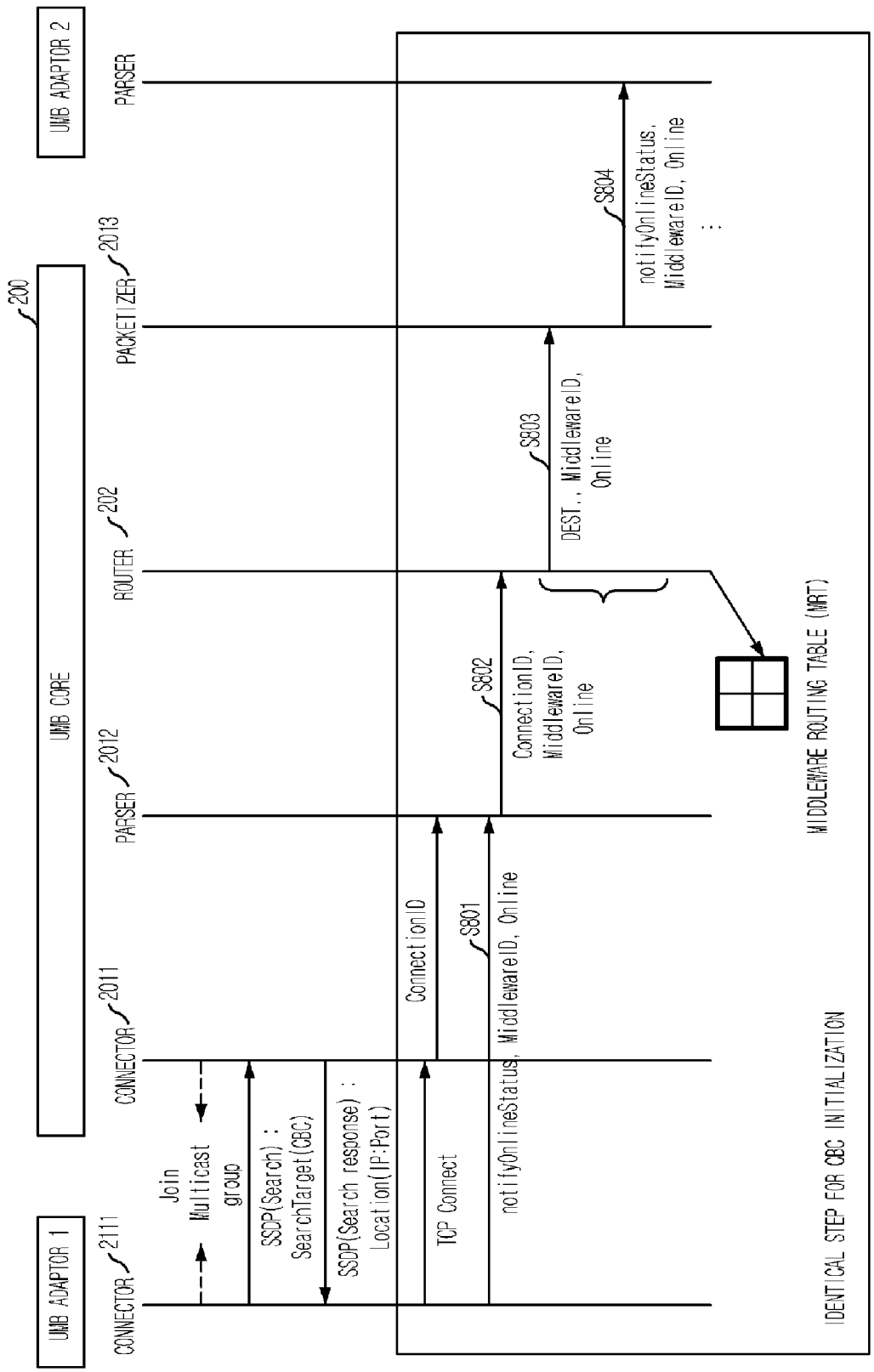
[Fig. 9]

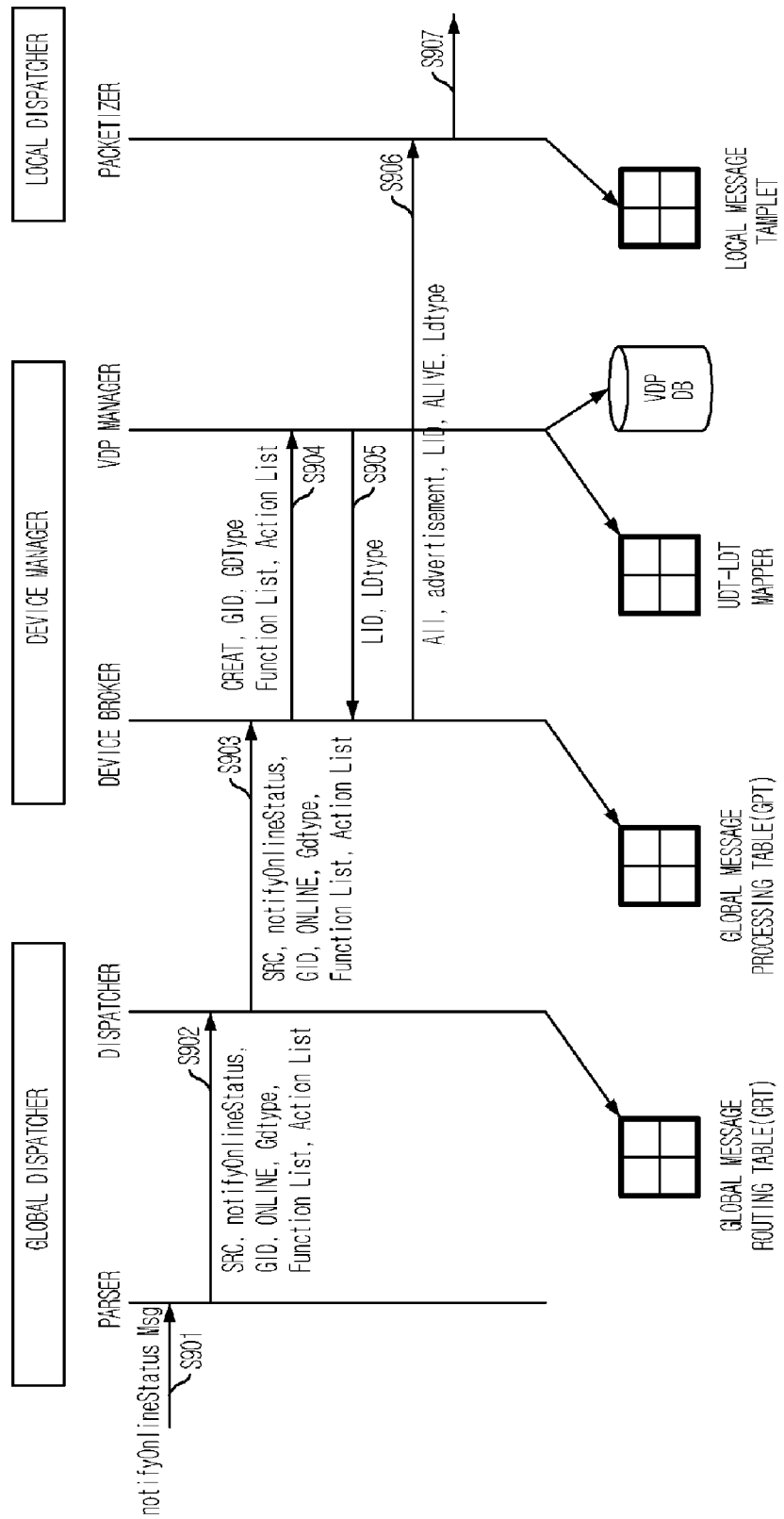
[Fig. 10]

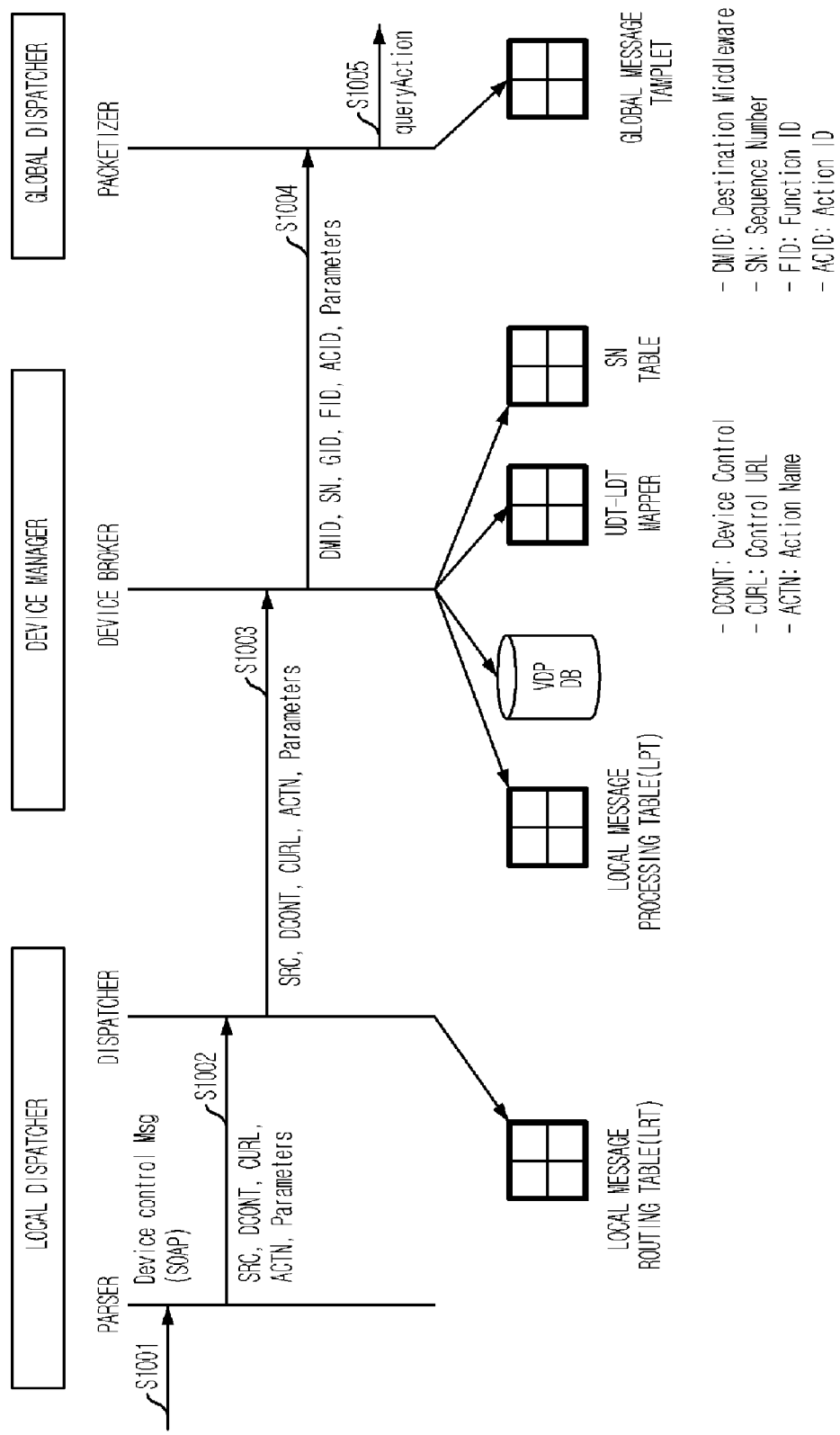
[Fig. 11]

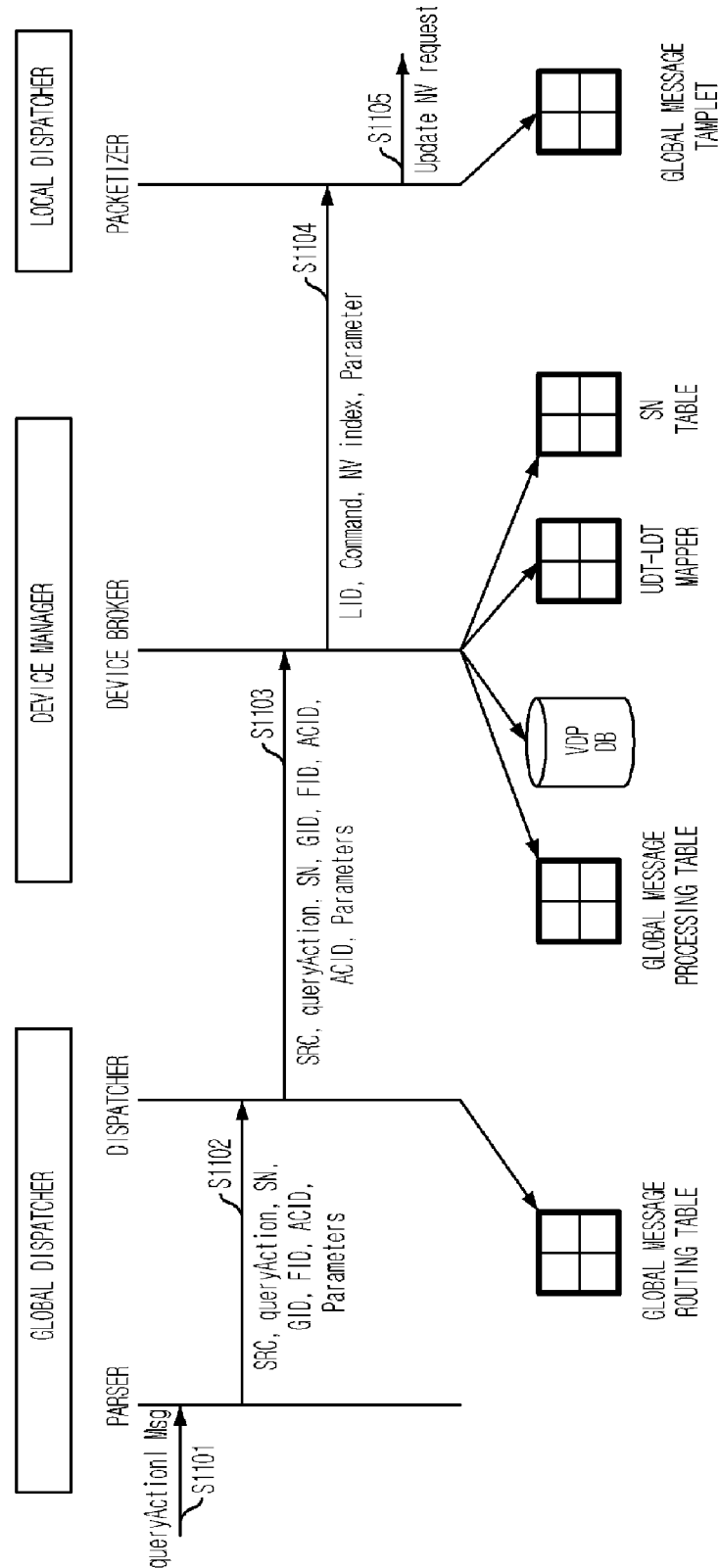
[Fig. 12]

[Fig. 13]
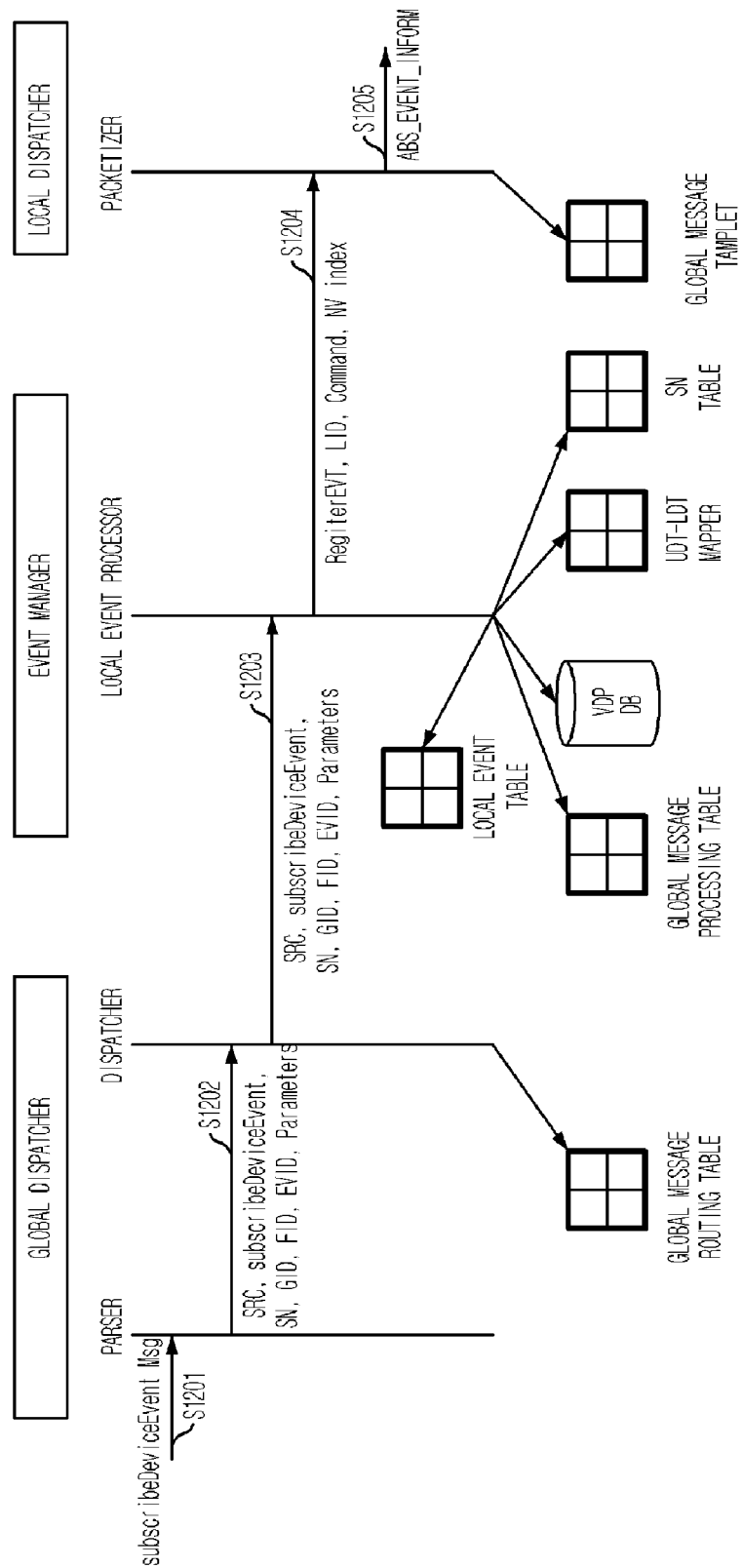

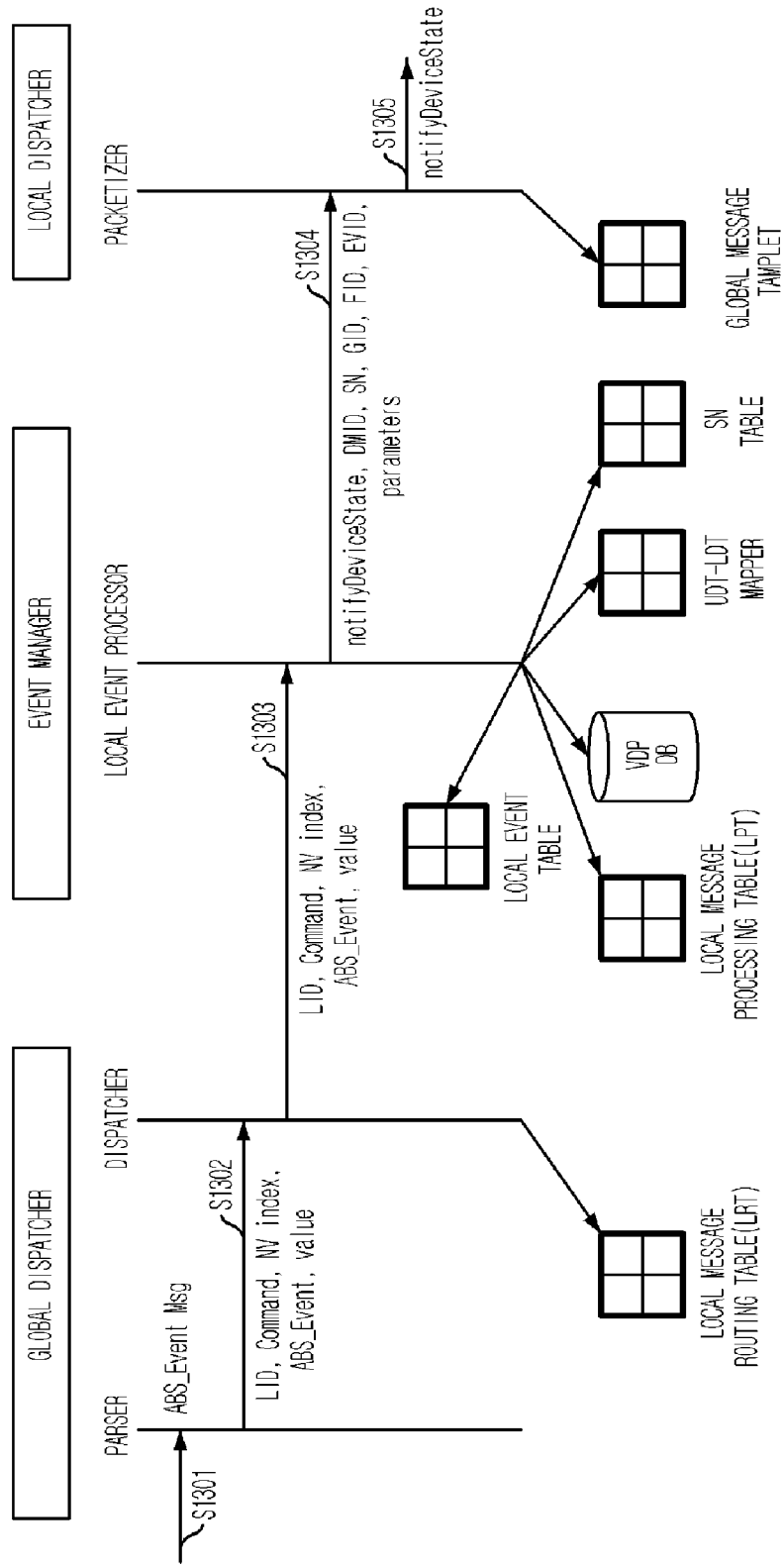

HOMENETWORK UNIVERSAL MIDDLEWARE BRIDGE SYSTEM AND METHOD FOR HOME DEVICE'S INTEROPERABILITY IN HETEROGENEOUS HOMENETWORK MIDDLEWARE

TECHNICAL FIELD

The present invention relates to a home network universal middleware bridge system and a method thereof; and more particularly, to a home-network universal middleware bridge system for providing interoperability to home devices connected to a home-network middleware, and a method thereof.

BACKGROUND ART

Recently, there are numerous home network middlewares introduced such as home audio video interoperability (HAVI), JINI, LonWorks, home network control protocol and a universal plug and play.

The HAVI was introduced on 1997 by home appliance manufacturers SONY, Phillips and Thomson, and the HAVI has been developed as a standard of audio and video (A/V) network based on high-speed bus employing IEEE 1394. The JINI was developed based on Java technology and requires JVM and RMI technology. The LonWorks was introduced by Echelon Company in U.S., and is a system providing total solution of automation technology supporting various communication medium. The HnCP is a protocol defined based on a power cable MODEM makers such as LG or SAMSUNG electronics in Korea. The UPnP is a middleware defined by an UPnP forum based on Microsoft and it employs TCP/IP based protocol.

These conventional middlewares uses different physical medium and protocols. Therefore, the interoperability is not provided to various devices connected to the middlewares. In order to overcome such a drawback, a conventional gateway is introduced in Korea Patent 10-0413684 entitled "GATEWAY ENABLING DATA COMMUNICATION BETWEEN DEVICE SEARCH HAVING DIFFERENT MIDDLEWARE, HOME NETWORK SYSTEM THEREBY, AND GATEWAY RELAYING METHOD" issued at Dec. 12, 2003, and It will be described with reference to FIG. 1.

FIG. 1 is a block diagram showing a conventional home-network system.

As shown in FIG. 1, the conventional home-network system includes a first device 100, a second device 110 and a gateway 120. The first device 100 uses a first middleware employing HAVI, and the second device 110 uses a second middleware employing UPNP.

The first device 100 includes a first function module 101 performing own functions; a first middleware 102 for analyzing and transforming messages transmitted or received from/to the first function module 101 according to a predetermined specification; and a first network accessing unit 103 for accessing a network to transmit the message from the first middleware 102, and transferring message received from the network to the first middleware 102 based on IEEE 1394.

The second device 110 includes: a second function module 111 for performing own functions; a second middleware 112 analyzing and transferring message to be transmitted or received to/from the second function module 110 according to a pre-determined specification defined in UPnP; and a second network accessing unit 103 for accessing a network to transmit the message from the second middleware 112 and transferring message received from the network to the second middleware 112 based on TCP/IP.

The gateway 120 relays messages to be exchanged between other devices by including middlewares employed by devices on the network. Such a relaying operation of the gateway 120 is classified into following three steps.

At first step, the first device 100 generates a message to be transmitted to the second device 110 and transmits the generated message to the gateway 120. The gateway 120 includes an arbiter 121, a generic HAVI agent 122, a generic UPnP agent 123, an IEEE 1394 processor 124 and a TCP/IP processor 125. Then, the generic HAVI agent 122 of the gateway 120 analyzes the message from the first device 100, transforms the message to be suitable to the generic UPnP agent 123 and transmits the message to the second device 110 at second step. At third step, the second device 110 processes the message from the gateway 120 and returns the result thereof.

The first device 100 employing the HAVI includes a first function module 100, a HAVI layer 102 and an IEEE 1394 layer. The first function module 101 creates a message that instructs a target function of the second device 110 and transfers the created message to the HAVI layer 102. Then, the HAVI layer 102 transforms the message to be suitable to HAVI specification and transmits the transformed message to the generic HAVI agent 122 of the gateway 120.

The generic HAVI agent 122 of the gateway 120 inquires availability of the second device 110 to the arbiter 121. The arbiter 121 inquires to the generic UPnP agent 123 whether the second device 110 is on the network since the received message is HAVI type.

The generic UPnP agent 123 searches a table in the IEEE 1394 processor 124 to find a name of the second device 110. If the name of the second device 110 is in the table, the generic UPnP agent 123 creates a message denoting that the second device 110 is on the network and transmits the message to the arbiter 121. If the second device 110 is available, the arbiter 121 transmits the message having the command of target function and parameters to the TCP/IP processor 125. The TCP/IP processor 125 transforms the message to be suitable for UPnP middleware specification and transmits the transformed message to the second device 110.

The UPnP layer 112 of the second device 120 analyzes the message received from the TCP/IP processor 125 and transmits the message to the second module 111. The second function module 111 performs the command of the message and returns the result to the arbiter 121 of the gateway 120. The arbiter 121 transmits the result to the first function module 101 of the first device 100.

As described above, the conventional home-network system has following shortcomings although the conventional home-network system provides basic interoperability between devices.

At first, there is no specification defined about how a target device is shown in a device that controls the target device and about the time automatically sensing the target device.

Secondly, middleware messages are transformed through a template of the middleware agent through the middleware agent and the arbiter using various trans-formation methods. Such message transform may be achieved in various methods such as a 1:1 bridge method. The 1:1 bridge method is a suitable method when there are few middlewares existed on the network. However, complexity of a message transforming template dramatically increases in proportional to the number of the middlewares on the network. Therefore, the 1:1 bridge method is not suitable method to transform the middleware messages when there are many different types of middlewares existed. Herein, the complexity of message transforming is $\{n \times (n-1)\}/2$, where n denotes the number of the home-network middlewares.

Thirdly, a method of finding a device through querying to all middleware agents generates the great number of the packets and causes greater load on the network.

Beside of the three problems, there is no specification for connecting/releasing devices, registering events and generating events in the conventional method of controlling and monitoring devices.

DISCLOSURE OF INVENTION

Technical Problem

It is, therefore, an object of the present invention to provide a home-network universal middleware bridge system for providing interoperability to home devices connected one another through different types of home-network middlewares, and a method thereof.

It is another object of the present invention to provides a home-network universal middleware bridge system and method for providing interoperability to home devices connected one anther through different types of home-network middlewares by allowing devices to virtually see all other devices accessing different home-network middlewares as devices connected on a same middleware and to process operations for a device accessing/releasing, a device control and an event registration/generation noticing based on a corresponding middleware mechanism without transforming related middleware messages.

Technical Solution

In accordance with one aspect of the present invention, there is provided a home-network universal middleware bridge system for providing interoperability between home devices connected one another through different types of home network middlewares, including: a bridge core for establishing/releasing a connection between bridge adaptors of different types of middlewares and analyzing/transferring a universal middleware message in order to interoperate devices connected through different types of middlewares existed on a home network; and a plurality of bridge adaptors for connecting the bridge core to a corresponding middleware, and finding/releasing different types of devices, controlling/monitoring different types of devices and registering/creating an event for different types of devices through transforming a universal middleware bridge message to a local message of each middleware and vice versa.

In accordance with another aspect of the present invention, there is provided a method of bridging for a home-network universal middleware bridge system, the method including the steps of: at a first bridge adaptor, generating a universal middleware bridge message by receiving a device local message from middlewares and creating a virtual/logical device for the device local message; at a bridge adaptor core, obtaining routing information by analyzing the universal middleware bridge message and transferring the universal middleware bridge message to a second bridge adaptor using the routing information; and at second bridge adaptor, transforming the universal middleware bridge message to a local message by analyzing the universal middleware bridge message.

Advantageous Effects

A home-network universal middleware bridge system and method thereof according to the present invention provide interoperability between various devices connected one another through different home network middleware without modifying a typical middleware. Accordingly, devices connected to the different middleware networks are recognized as devices connected to own network. Therefore, the devices connected to the different middleware networks are controlled and monitored as like as the devices connected to the own network.

The home-network universal middleware bridge system according to the present invention allows various types of middlewares and various different types of devices to be connected a single home network without any limitation. Therefore, a digital home can be achieved conveniently and efficiently.

BRIEF DESCRIPTION OF THE DRAWINGS

FIG. 1 is a block diagram showing a conventional home-network system;

FIG. 2 is a block diagram illustrating a home network universal middleware bridge system in accordance with a preferred embodiment of the present invention;

FIG. 3 is a table showing definitions of a UMB message in accordance with a preferred embodiment of the present invention;

FIG. 4 is a middleware routing table (MRT) of a UMB core 200 in accordance with a preferred embodiment of the present invention;

FIG. 5 is a flowchart showing a method of bridging in a LonWorks adaptor when a new LonWorks device is plugged in a LonWorks middleware in accordance with a preferred embodiment of the present invention;

FIG. 6 is a table of information describing a universal device, i.e., a light device in accordance with a preferred embodiment of the present invention;

FIG. 7 shows a virtual device proxy (VDP) database (DB) in accordance with a preferred embodiment of the present invention;

FIG. 8 shows UDT-LDT mapping tables in accordance with a preferred embodiment of the present invention;

FIG. 9 is a flowchart showing a method of bridging in a UMB core when a device is plugged in a UMB adaptor in accordance with a preferred embodiment of the present invention;

FIG. 10 is a flowchart showing a method of bridging in an UPNP adaptor when a LonWorks device is plugged in accordance with a preferred embodiment of the present invention;

FIG. 11 is a flowchart showing a method of bridging in an UPnP adaptor when an UPnP control point controls a LonWorks device at a remote location in accordance with a preferred embodiment of the present invention;

FIG. 12 is a flowchart showing a method of bridging in a LonWorks adaptor when a device at a remote location requests to control a LonWorks device in accordance with a preferred embodiment of the present invention;

FIG. 13 is a flowchart showing a method of bridging in a LonWorks adaptor when a device at a remote location request to register events for a LonWorks device in accordance with a preferred embodiment of the present invention; and FIG. 14 is a flowchart showing a method of bridging in a LonWorks adaptor when a registered event is generated in a LonWorks device in accordance with a preferred embodiment of the present invention.

BEST MODE FOR CARRYING OUT THE INVENTION

Other objects and aspects of the invention will become apparent from the following description of the embodiments with reference to the accompanying drawings, which is set forth hereinafter.

The present invention relates to a home-network universal middleware bridge system for providing interoperability to home devices connected one another through different types of home-network middlewares such as an Home Audio Video Interoperability (HAVI), JINI, LonWorks, Home network control protocol (HnCP) and an universal plug and play (UPnP), and a method thereof.

FIG. 2 is a block diagram illustrating a home network universal middleware bridge system in accordance with a preferred embodiment of the present invention.

Referring to FIG. 2, the home network universal middleware bridge system includes a single universal middleware bridge (UMB) core 200 and universal middleware bridge (UMB) adaptors 210, 240, 260 and 280 located over the middleware layers.

As shown, the home-network UMB system according to the present invention virtually expresses physical devices plugged in a home network middleware domain as logical devices plugged in a UMB domain. Also, the home-network UMB system according to the present invention allows the logical devices to be registered on corresponding middlewares. As result, the home-network UMB system according to the present invention allows a device to see all other devices connected on different middleware domains as virtual logical devices connected on a same middleware domain. Therefore, the UMB system according to the present invention can process events, control devices and monitor devices based on a typical middleware mechanism without transforming messages according to corresponding middlewares.

In order to provide interoperability between home devices connected through different types of home network middlewares, the home network UMB system according to the present invention includes a UMB core 200 for interoperating devices connected through different middlewares on a home network, establishing/releasing the connected bridge adaptors of different middlewares and analyzing/transferring UMB messages; and a plurality of universal middlewares bridge adaptors 210, 240, 260 and 280 for connecting corresponding middlewares to the UMB core 200, finding/releasing devices connected through different middlewares, controlling/monitoring the devices, registering/noticing generations of events by transforming local messages of each middleware to the UMB message and vice versa.

Hereinafter, the home network UMB system according to the present invention will be described in detail.

The UMB middleware core 200 includes a global dispatcher 201, a message router 202, and a middleware routing table (MRT) 203.

The global dispatcher 201 includes a connector 2011 for managing the UMB adaptors 210, 240, 260 and 280 to be connected and disconnected; a parser 2012 for analyzing UMB messages and transferring the UMB messages to the message router 202; and a packetizer 2013 for transferring the UMB message using routing information. That is, the global dispatcher 201 receives the UMB messages from the UMB adaptors, analyzes the received UMB messages and transfers the UMB messages to the message router 202. Also, the global dispatcher 201 transfers the UMB messages to a destination which is a target UMB adaptor according to routing information received from the message router 202.

The message router 202 routes the UMB messages to a corresponding UMB adaptor. The MRT 203 stores information about connection IDs and middleware IDs between devices and UMB adaptors. For example, the message router 202 transfers routing information about a target UMB adaptor to the global dispatcher 201 using the MRT 203.

The UMB core 200 performs operations of basic functions such as establishing/releasing connections between devices and UMB adaptors 210, 240, 260 and 280, analyzing the UMB messages and routing the UMB messages, and related operations thereof in order to provide interoperability between devices connected through different middlewares by connecting the different middlewares 220, 250, 270 and 290 through the universal middleware bridge in a wireless/wired integrated home network environment.

The UMB adaptors 210, 240, 260 and 280 perform operations related to find/release devices, control/monitor devices and register/create events. Each of the UMB adaptors includes a global dispatcher 211, a device manager 212, an event handler 213, a local dispatcher 214, a universal device template to local device template (UDT-LDT) mapper 215, a virtual device proxy (VDP) database 216, a sequence table and a global and local event table. Detail operations thereof will be described with reference to FIG. 5 in later.

The UMB adaptors 210, 240, 260 and 280 are a module for connecting the UMB core 200 and a lower level middleware network. That is, the UMB adaptors provide services of connecting/releasing devices, controlling/monitoring devices and registering/generating events.

Each of the UMB adaptors 210, 240, 260 and 280 includes a local dispatcher 214, a device manager 121, an event handler 213, a mapping information storing unit 215 such as a mapper, a VDP storing unit 216 and a global dispatcher 211. Since all of the UMB adaptors have same structure, the UMB adaptor 210 is used as the representative one to describe the UMB adaptors 210, 240, 260 and 280.

The local dispatcher 214 receives local messages to be transmitted to other external bridge adaptors from a corresponding middleware and transfers the received local message to the device manager 212 or the event handler 213 using a local message routing table (LRT). The device manager 212 or the event handler 213 receives a transformed LDT information message, create a local message and transfers the created local message to a corresponding middleware.

The device manager 121 transforms the local message to a message having the UDT information, and transfers the transformed message to the global dispatcher 211. Or, the device manager 121 receives the UMB message from the global dispatcher 211, transforms the received message to a local device information message, and transfers the transformed message to the local dispatcher 213. In particular, the device manager 212 includes a device manager 2121 and a device broker 2122. The device manager 2121 transforms the local device information to the UMB information or vise versa using the UDT-LDT mapping information and stores the transformed information in the VDP database 216. The device broker 2122 sends a command message to the VDP manager 2121 to transform the information and receives the transformed information as a response from the VDP manager 2121. The device broker 2122 transmits the transformed information to the global dispatcher 211 or the local dispatcher 214.

The event handler 213 includes a remote event handler 2131 and a local event handler 2132. The event handler 213 receives a request of registering an event from external devices through other bridge adaptor, analyzes the event registering request of a UMB message and registers the event. The event handler 213 also transforms an even generation local message received through an own middleware to an UDT information message.

The global dispatcher 211 receives a UMB message from the UMB core 200 and transfers the received UMB message to the device manager 212 or the event handler 213 using a global routing table (GRT). Also, the global dispatcher 210 receives an UDT information message from the device manager 212 or the event handler 213, transforms the received UDT information message to an UMB message, and transfers the UMB message to the UMB core 200.

The UDT-LDT mapping information storing unit 215 stores mapping information between local device information and virtual universal device information. The VDP database 216 stores local device information and virtual universal device (UD) information.

FIG. 3 is a table showing definitions of a UMB message in accordance with a preferred embodiment of the present invention.

As shown, the UMB adaptors 210, 240, 260 and 280 transform middleware messages to UMB messages and transfer the UMB messages to other UMB adaptors through the UMB core 200.

FIG. 4 is a middleware routing table (MRT) of a UMB core 200 in accordance with a preferred embodiment of the present invention. That is, FIG. 4 shows data structure of MRT which is only data structure managed by the UMB core.

The MRT is configured of three fields, an index field, a file descriptor field and a middleware ID.

The index field denotes how many data in the MRT. For example, if the index=3, there are three data included in the MRT.

The file descriptor field denotes a connection point of a network socket of UMB adaptors that are currently connected to the UMB core 200. For example, if a LonWorks adaptor has a connection point to the UMB core as Fd0, the value of Fd is an integer as like as Fd0=3540. In order to transfer a message to the LonWorks Adaptor, a function 'send(Fd0, message)' is executed. Then, a message is transmitted from the UMB core to the LonWorks Adaptor through the network.

The middleware ID field denotes identifications (ID) of adaptors currently connected to the UMB core. For example, if Index=1, Fd1=3555 and LonWorks is in the MRT, it means that data having an index 1 which is a second data has a 3555 of connection point to the UMB core and the adaptor is the LonWorks adaptor.

FIG. 5 is a flowchart showing a method of bridging in a LonWorks adaptor when a new LonWorks device is plugged in a LonWorks middleware in accordance with a preferred embodiment of the present invention.

That is, when the new LonWorks device is plugged in a LonWorks middleware, operations for noticing information about new device to UMB adaptors 240, 260 and 280 through a LonWorks UMB adaptor 210 are shown in FIG. 5.

Hereinafter, operation mechanism of the UMB system according to the present invention will be described using interoperation mechanism between LonWorks devices and UPnP devices as an example. Other devices connected to other middleware can also have same interoperation services through following operation mechanism.

At first, if a new LonWorks device is plugged in a LonWorks middleware 220, an internal parser 2141 of a local dispatcher in a LonWorks UMB adaptor 210 receives a message "Service Pin Msg" noticing the connection of new device through a LonWorks middleware 220 at step S501.

The internal parser 2141 of the local dispatcher analyzes the corresponding local message and transfers a message having parameters in the analyzed local message such as a SPIN, LID and PID to a dispatcher 2142 of the local dispatcher at step S502. Herein, the SPIN denotes the message "Service Pin Msg," the LID denotes a local ID and the PID denotes a program ID.

The dispatcher 1242 of the local dispatcher transfers the received parameters to the device manager 212 or the event handler 213 using the local message routing table (LRT). Herein, a message related to the device event is transferred to the event handler 213 and other messages are transferred to the device manager 212.

When a device broker 2122 of the device manager 212 receives the message having the parameters such as the SPIN, LID and PID, which denotes that a new device is connected, at step S503, the device broker 2122 transmits a message having CREAT, LID and LDType to a VDP manager 2121 in order to instruct the VDP manager 2121 to register physical device information on the VDP database and corresponding virtual device information used in the UMB at step S504.

The VDP manager 2121 transforms the LonWorks physical device to a virtual device through the UDT-LDT mapper 215 and generates a VDP DB 216 (refer to FIG. 7).

Then, the VDP manager 2121 transfers an UDT information including GID, GDType to the device broker 2122 at step S505. The UDT information is information about transformation of newly connected physical device to the virtual device. Herein, the GID represents a Global ID and the GDType denotes a global device type.

After receiving the UDT information, the device broker 2122 transmits a message including the UDT information which also includes All denoting a multicasting, notifyOnlineStatus, GID, ONLINE, GDType, Function List, and Action List to the packetizer 2114 of the global dispatcher 211 at step S506. The packetizer 2114 transforms the received message to UMB message ("notifyOnlineStatus" in FIG. 3) and transmits the transformed UMB message to the UMB core 200 at step S507.

FIG. 6 is a table of information describing a universal device, i.e., a light device in accordance with a preferred embodiment of the present invention. That is, FIG. 6 shows information about an UD of a light device that is a virtual device transformed from the physical device, i.e., the light device.

That is, FIG. 6 shows fields of virtual device defined to be recognized by all of middlewares on a home network through a UMB through transforming a physical device to a virtual device.

The UDT is a set of information about all virtual universal devices. Therefore, the UDT includes UDs of various devices, i.e., a dimmer, a television, an audio system, a switch and a valve as well as an UD of a light.

As shown, each of UD includes a device type, a function ID, an action ID, an event ID and a parameter.

Devices on all of middleware networks are transformed as an UD shown in FIG. 6 and used as virtual logical devices on the UMB system.

FIG. 7 shows a virtual device proxy (VDP) database (DB) in accordance with a preferred embodiment of the present invention, and FIG. 8 shows UDT-LDT mapping tables in accordance with a preferred embodiment of the present invention.

As shown in FIG. 7, The VDP DB includes information about physical devices and information about universal devices expressed on the UMB. Therefore, a real physical device is transformed to a virtual universal device through the VDP DB when a new real device is plugged in the home network. On the contrary, when a universal device of a universal middleware bridge (UMB-UD) is connected to the UMB adaptor through the UMB core 200, the UMB-DB can be transformed to a local device (LD) which is a real device through the VDT DB. Also, the controlling and the monitoring of the UDs and the Local devices can be performed using the VDP DB.

As shown in FIG. 6, because the universal devices are defined as a global function, a global action and a global event, the controlling and the monitoring can be achieved through real-time message transformation during a run time by registering the real local function, the real local action and the real local event in the VDP DB table.

As shown FIG. 8, the universal device type (UDT)-local device type (LDT) mapper includes transform tables for transforming a universal device (UD) to a local device (LD) or vice versa.

FIG. 9 is a flowchart showing a method of bridging in a UMB core when a device is plugged in a UMB adaptor in accordance with a preferred embodiment of the present invention. That is, FIG. 9 shows operations of the universal middleware bridge core.

A SSDP step in FIG. 9 denotes a step for finding information about a location of the UMB core 200 such as IP and Port at the UMB adaptor 210.

The message transformed through the step S507 in FIG. 5 is transferred to a parser 2012 of the UMB core 200 at step S801.

The parser 2012 analyzes the transferred message and transfers parameters of the analyzed message to the router 202 at step S802.

The router 202 determines whether the transferred message is a multicast message or a unicast message at step S803. Herein, the multicast message denotes a device connection/releasing message and the unicast message denotes a device control/monitor message or an event registering/creation message. If the message is the multicast message, the router 202 transfers the received message to all of universal middleware bridge adaptors registered in the middleware routing table (MRT) through the packetizer 2013 at step S804.

On the contrary, if the message is the unicast message, the router 202 transfers corresponding messages to universal middleware adaptors having a same ID to the middleware ID in the parameter transferred from the MRT.

FIG. 10 is a flowchart showing a method of bridging in an UPNP adaptor when a LonWorks device is plugged in accordance with a preferred embodiment of the present invention.

When a parser of the global dispatcher of the UPnP adaptor 240 receives a UMB message transferred through the steps shown in FIG. 9 at step S901, the parser analyzes the corresponding message and transfers the parameters to the dispatcher of the global dispatcher at step S902.

The dispatcher of the global dispatcher transfers the messages with the parameters from the parser to the device manager, for example, the device manager 212, or the event handler, for example, the event handler 213, with reference to a global message routing table (GRT). Herein, the messages related to the event are transferred to the event handler and other messages are transferred to the device manager.

Since the currently transmitted messages are related to the device connection, these messages are transferred to the device broker of the device manager at step S903.

The device broker determines whether the received messages are related to the device connection and instructs the VDP manager to create a virtual device on the VDP DB at step S904.

The VDP manager transforms a universal device template (UMT), which is a virtual device of the LonWorks physical device, to a local device on the UPnP network through the UDT-LDT mapper, and creates a VDP DB thereof. When a remote virtual device is created at the VDP DB, the created virtual device is recognized by all other UPNP devices as a real physical device connected to the UPnP network. Therefore, such a remote virtual device can be controlled and monitored by a conventional UPnP middleware controlling mechanism.

When the new device information is created in the VDP DB, the VDP manager transfers a message having a local ID and a local device type (LD type) to the device broker at step S905.

Then, the device broker transfers an advertisement message to a middleware of UPnP adaptor through a local dispatcher to notice that a newt device is plugged-in at steps S906 and S907.

The steps shown in FIGS. 5, 9 and 10 are one cycle of operating mechanism of the adaptors of the home network UMB system when new device is connected. Meanwhile, the device release operation is similar to the device connection operation. But, information related a released device is deleted from the VDP DB when the device is released.

The bridge methods for the device controlling/monitoring message and for the event registering/creation message are similar to the bridge methods for the device connection shown in FIGS. 5, 9 and 10. Therefore, the bridge methods for the device controlling/monitoring and for the event registering/creation will be explained in brief with reference to FIGS. 11 to 14.

FIG. 11 is a flowchart showing a method of bridging in an UPNP adaptor when an UPnP control point controls a LonWorks device at a remote location in accordance with a preferred embodiment of the present invention.

When the UPnP control point 250 controls the LonWorks device 230 at a remote location, a local UPnP message is transformed to a universal middleware bridge (UMB) control message (queryAction) by the UPNP adaptor 240 and the UMB control message is transferred to the UMB core 200 at steps S1001 to S1005.

FIG. 12 is a flowchart showing a method of bridging in a LonWorks adaptor when a device at a remote location requests to control a LonWorks device in accordance with a preferred embodiment of the present invention.

When devices, i.e., devices in adaptors 240, 260 and 280, requests to control a LonWorks device 230, a common bridge message transmitted through the UMB core 200 to the LonWorks adaptor 210 is transformed to a local LonWorks message and the LonWorks device 230 is controlled according to the transformed local LonWorks message at steps S1101 to S1105.

FIG. 13 is a flowchart showing a method of bridging in a LonWorks adaptor when a device at a remote location request to register events for a LonWorks device in accordance with a preferred embodiment of the present invention.

When a device in a remote location, i.e., devices in the adaptors 240, 260 and 280, requests to register an event of the LonWorks device 230, the steps S1201 to S1205 denote operation mechanism of the LonWorks adaptor 210. The event transferred through the UMB core 200 is registered at a local event table and the event registered at the local event table is regularly checked whether a corresponding event value is modified or not through an event method or a poling method.

FIG. 14 is a flowchart showing a method of bridging in a LonWorks adaptor when a registered event is generated in a LonWorks device in accordance with a preferred embodiment of the present invention.

As shown in FIG. 14, the registered event is transferred to a UDT through the LonWorks adaptor 210 and the UDT is transferred to the remote devices in the adaptors 240, 260 and 280 through the LonWorks adaptors 210 at steps S1301 to S1305.

The methods according to the present invention can be embodied as a program, and the program can be stored in a computer readable recording medium such as a compact disk read only memory (CD-ROM), a random access memory (RAM), a read only memory (ROM), a floppy disk, a hard disk or an optical magnetic disk.

The present application contains subject matter related to Korean patent application No. 2004-0108285, filed with the Korean Intellectual Property Office on Dec. 17, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A home-network universal middleware bridge system for providing interoperability between home devices connected to one another through different types of home network middlewares, the home-network universal middleware bridge system comprising:
   a bridge core having a first global dispatcher and a message router, the bridge core being configured for establishing/releasing a connection between bridge adaptors of different types of middlewares and analyzing/transferring a universal middleware message in order to interoperate home electronic devices connected through the different types of middlewares provided on a home network; and
   a plurality of bridge adaptors for connecting the bridge core to a corresponding middleware, and finding/releasing different types of devices, controlling/monitoring different types of devices and registering/creating an event for different types of devices through transforming a universal middleware bridge message to a local message of each middleware,
   wherein each bridge adaptor includes:
   a first local dispatcher for receiving a local message to be transmitted to an external bridge adaptor from a corresponding middleware;
   a device manager for transforming the local message to a message including UDT information and transferring the message to a second global dispatcher;
   an event processor for analyzing the universal middleware bridge message for requesting an event registering transferred through an external bridge adaptor and registering an event;
   a second global dispatcher for receiving the universal middleware bridge message from the bridge core;
   a UDT-LDT mapping information storing unit for storing mapping information between real local device information and virtual universal device information; and
   a VDP storing unit for storing information about real local devices and information about virtual universal devices.

2. The home-network universal middleware bridge system as recited in claim 1, wherein the message router is configured to determine whether the universal middleware bridge message is a multicast message or a unicast message, wherein the multicasting message includes a device connecting/releasing message; and
   the unicast message includes a device controlling/monitoring message and an event registering/creating message.

3. The home-network universal middleware bridge system as recited in claim 1, wherein the first global dispatcher includes:
   a connector for managing operations for establishing and releasing connections between the bridge adaptors;
   a parsing component for analyzing the universal middleware bridge message and transferring the analyzed universal middleware bridge message to the message router; and
   a packetizing component for transferring the universal middleware bridge message to the target bridge router using the routing information.

4. A home-network universal middleware bridge system for providing interoperability between home devices connected to one another through different types of home network middlewares, the home-network universal middleware bridge system comprising:
   a bridge core having a first global dispatcher and a message router, the bridge core being configured for establishing/releasing a connection between bridge adaptors of different types of middlewares and analyzing/transferring a universal middleware message in order to interoperate home electronic devices connected through the different types of middlewares provided on a home network; and
   a plurality of bridge adaptors for connecting the bridge core to a corresponding middleware, and finding/releasing different types of devices, controlling/monitoring different types of devices and registering/creating an event for different types of devices through transforming a universal middleware bridge message to a local message of each middleware and vice versa,
   wherein each bridge adaptor includes:
   a first local dispatcher for receiving a local message to be transmitted to other external bridge adaptor from a corresponding middleware, transferring the local message to a device manager or an event handling means using a local routing table (LR T), or receiving a LDT information message that is transformed at the device manager or the event handling means, generating a local message and transferring the local message to a corresponding middleware;
   the device manager for transforming the local message to a message including UDT information and transferring the message to a second global dispatcher, or transferring the universal middleware bridge message from the second global dispatcher to a local device information message and transferring the local device information message to the first local dispatcher;
   an event processor for analyzing the universal middleware bridge message for requesting an event registering transferred through other external bridge adaptor and registering an event, and transforming an event creation local message transferred through middleware of the bridge adaptor to a UDT information message;
   the second global dispatcher for receiving the universal middleware bridge message from the bridge core, transferring the received universal middleware bride message to the device manager or the event handling means using a global message routing table (GRT), or receiving a UDT information message from the device manager or the event handling means, transforming the UDT information message to a universal middleware bridge message and transferring the universal middleware bridge message to the bridge core;
   UDT-LDT mapping information storing means for storing mapping information between real local device information and virtual universal device information; and
   VDP storing means for storing information about real local devices and information about virtual universal devices.

5. The home-network universal middleware bridge system as recited in claim 4, wherein the device manager includes:

VDP managing means for transforming real local device information to virtual universal device information or vice versa using the UDT-LDT mapping information and storing the transformed information in the VDP storing means; and device broker means for sending a command message to transform information to the VDP managing means, receiving the transformed information as a response, and transferring the received information to the second global dispatcher or the first local dispatcher.

6. The home-network universal middleware bridge system as recited in claim 4, wherein the universal middleware bridge message includes a device finding noticing/releasing message, a device controlling/monitoring message and an event registering/creating noticing message.

7. The home-network universal middleware bridge system as recited in claim 4, wherein the middleware routing table (MR T) includes an index field, a file descriptor field and a middleware ID field.

8. The home-network universal middleware bridge system as recited in claim 4, wherein the UDT information includes a device type, a function ID, an action ID, an event ID and parameter.

9. The home-network universal middleware bridge system as recited in claim 4, wherein the VDP storing means includes an index field, a virtual/physical field, a global identification (GID) field, a local identification (LD type) field, a local address field, a function list field, and an action list field.

10. The home-network universal middleware bridge system as recited in claim 4, wherein the mapping information of the UDT-LDT mapping information storing means includes a device mapping table, a function mapping table, an action/event mapping table and a parameter mapping table.

* * * * *